United States Patent [19]

Simon

[11] 4,041,034

[45] Aug. 9, 1977

[54] HEAT-CONVERTIBLE REACTION PRODUCTS OF EQUAL MOL RATIOS OF S-DIPHENYLCARBAZIDE AND AN AROMATIC DIANHYDRIDE

[76] Inventor: Eli Simon, 7175 Little Harbor Drive, Huntington Beach, Calif. 92648

[21] Appl. No.: 706,477

[22] Filed: July 19, 1976

[51] Int. Cl.² .................. C07D 237/32; C08G 73/10; C07G 73/00

[52] U.S. Cl. ............................. 260/250 P; 420/411; 428/474; 260/77.5 R; 260/78 TF; 260/78.41

[58] Field of Search .................................. 260/250 P

[56] References Cited

FOREIGN PATENT DOCUMENTS 87,828  9/1959  Denmark .......................... 260/250 P

*Primary Examiner*—Nicholas S. Rizzo

[57] ABSTRACT

The subject of this invention, heat-convertible reaction products of s-diphenylcarbazide and an aromatic dianhydride, are prepared by reacting 1:1 mol ratios of s-diphenylcarbazide and an aromatic dianhydride in a mutual solvent such as 1-methyl-2-pyrrolidinone, at a temperature greater than 150° C. and less than 200° C.

2 Claims, No Drawings

HEAT-CONVERTIBLE REACTION PRODUCTS OF EQUAL MOL RATIOS OF S-DIPHENYLCARBAZIDE AND AN AROMATIC DIANHYDRIDE

The intermediate, solvent-soluble reaction products are applied from solution to various substrates such as aluminum, iron, titanium, glass filament, graphite filaments, etc., and after evaporation of the solvent at temperatures up to approximately 150° C., the deposits are thermoset by elevating the temperature in excess of 250° C. to form continuous, flexible, adherent, heat-resistant coatings.

The reaction products of this invention appear primarily applicable for thin film usage such as for the surface treatment of solid and filamentary substrates to improve interlaminar adhesion and shear strength in composite structures, and as thermal and oxidative resistant barrier coatings for metals such as aluminum, iron, and their alloys.

DESCRIPTION OF THE INVENTION

The heat-convertible, intermediate, solvent-soluble, reaction products of this invention are obtained by pre-dissolving the aromatic dianhydride in the mutual solvent, such as 1-methyl-2-pyrrolidinone, adding an equivalent weight in moles of s-diphenylcarbazide, and under reflux conditions raising the temperature gradually not to exceed 200° C. An adequate cycle comprises, approximately: 2 hours at 150° C; 3 hours at 160° C; 4 hours at 170° C; and 6 hours at 180° C. There is considerable variation in the "hold" times at a particular temperature, provided that there are 5 to 10 hours at a temperature of 170°–190° C. The volume of the mutual solvent used should be adequate to solubilize the reaction products; a range of one to 3 liters for a total of 2 moles of the components, ie., 1 mol each of s-diphenylcarbazide and the aromatic dianhydride, appears adequate. Illustrative of the aromatic dianhydrides are: pyromellitic dianhydride, or 1,2,4,5-benzenetetracarboxylic dianhydride; 3,3',4,4'-benzophenonetetracarboxylic dianhydride; and, 1,4,5,8-naphthalenetetracarboxylic dianhydride.

The intermediate, solvent-soluble reaction products are applied to the various substrates, ie., glass, graphite, aluminum, iron, titanium, etc., from solvent solutions comprising those: at the completion of the reaction; after partial removal of the high boiling mutual solvent and reconstituting with a more volatile solvent such as methyl ethyl ketone; and, by recovering the reaction products as dry solids by vacuum stripping of the mutual solvent and drying at approximately 150° C., followed by solubilization in more volatile solvents such as methyl ethyl ketone.

Thin films applied from solution and subsequently thermoset at temperatures in excess of approximately 250° C. are flexible, cohesive, and adherent to various substrates; conversion to the infusible state is very rapid, after the solvent has been released, at temperatures in excess of 350° C. It is postulated, without limiting the concept of the invention, that during the intermediate stage of the reaction the anhydride ring is opened to form the polyamic acid, and that the subsequent heat-conversion is accomplished by dehydration and ring closure. These are indicated as partial reactions under Stages I and II, as follows:

Stage I - Formation of the intermediate, solvent-soluble polyamic acids.

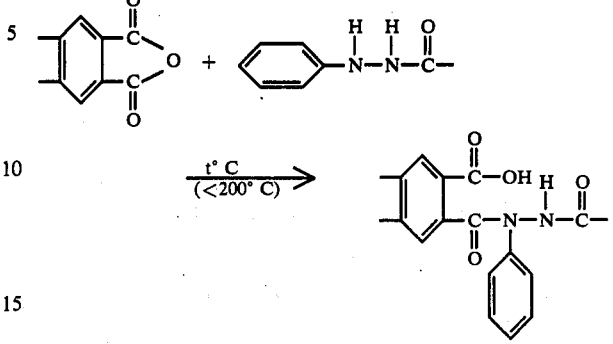

Stage II - Dehydration and ring closure

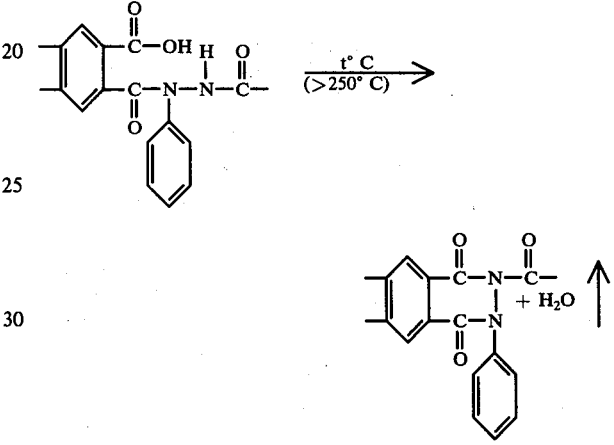

EXAMPLES OF THE INVENTION

EXAMPLE 1.

"Reaction Products of Equal Mol Ratios of Pyromellitic Dianhydride and s-Diphenylcarbazide"

Proportional aliquots of 1-mol of pyromellitic dianhydride, 1-mol of s-diphenylcarbazide, and 2-liters of 1-methyl-2-pyrrolidinone were reacted under reflux conditions to determine the effect of varying the time/temperature conditions on the characterisitcs of the thermoset products. The reaction conditions, 5° C., included:

a. 6 hours at 150° C, plus 9 hours at 175° C.
b. 30 hours at 150° C, plus 11 hours at 160° C, plus 11 hours at 170° C.
c. 2 hours at 150° C, plus 3 hours at 160° C, plus 4 hours at 170° C, plus 6 hours at 180° C.
  6 hours at 150° C, plus 9 hours at 175° C, plus 3 hours at 190° C.
  6 hours at 150° C.
f. Solubilization, only, by heating for approximately 15 minutes at less than 100° C.

The intermediate reaction products were applied as thin films to substrates of aluminum, iron, titanium, and glass cloth; the solvent was removed by heating at 150° C.; and cures were effected by exposure to an oven temperature of approximately 315° C. for 1/2 hour, and by the controlled application of a laboratory-type bunsen burner flame for several seconds. Reaction conditions a)-d) inclusive deposited adherent, flexible coatings; reaction condition f) deposited frothy, brittle, non-cohesive products; reaction condition e) was better than reaction condition f) in that the cured products were more continuous, but were more brittle, less cohesive, and less adherent than the thermoset products from reaction conditions a)-d) inclusive.

EXAMPLE 2.

"Reaction Products of 3,3′,4,4′-Benzophenonetetracarboxylic Dianhydride and s-Diphenylcarbazide"

Benzophenonetetracarboxylic dianhydride was substituted for pyromellitic dianhydride in Ex.1. The reaction conditions included:
a. 1 hour each at 150°-160° C., 160°-170° C., 170°-180° C., 180°-190° C., plus 5 hours at 190°-200° C.
b. 5 hours at 150°-160° C., plus 10 hours at 175°-185° C.

After solvent removal at approximately 150° C., both of the intermediate reaction products cured to give thin film adherent, flexible, continuous, cohesive deposits when heated in excess of 300° C.

EXAMPLE 3.

"Reaction Products of 1,4,5,8-Naphthalenetetracarboxylic Dianhydride and s-Diphenylcarbazide"

Naphthalenetetracarboxylic dianhydride was substituted for pyromellitic dianhydride in Ex.1. The solvent solution was heated under reflux for 17 hours at 160° C., plus 5 hours at 170° C. After solvent removal at 150° C., thin films were thermoset to give hard, adherent deposits when heated at approximately 300° C.

EXAMPLE 4.

"Reaction Products of 1-mol Pyromellitic Dianhydride:2-moles s-Diphenylcarbazide"

Proportional aliquots of 1-mol pyromellitic dianhydride, 2-moles s-diphenylcarbazide, and 2-liters of 1-methyl-2-pyrrolidinone were reacted for 5 hours at 150° C., plus 4 hours at 175° C., plus 3 hours at 190° C., after which thin films were applied from solution to metallic substrates, heated at 150° C. to remove solvent, and thermoset by bunsen-burner flaming for several seconds. The thermoset films were not as tough, cohesive, or adherent as the 1:1 mol ratios of reactants for conditions a)-d) incl.

EXAMPLE 5.

"Solvent-Reconstitution of the Reaction Products"

The bulk of the 1-methyl-2-pyrrolidinone of Ex.2, procedure a), was removed by vacuum stripping at less than 150° C, and the residue dried at approximately 150° C. The dried solid was dissolved in methyl ethyl ketone, the solution was applied to an aluminum substrate, and the MEK was evaporated at approximately 100° C. The thin film was thermoset by flaming with a laboratory-type bunsen burner for several seconds, and when fuming had substantially ceased, the coating was very tough, flexible, cohesive, and adherent.

1. Heat-convertible, solvent-soluble, intermediate products of equal mol ratios of s-diphenylcarbazide and an aromatic dianhydride selected from pyromellitic dianhydride, 3,3′,4,4′-benzophenonetetracarboxylic dianhydride, and 1,4,5,8,-naphthalenetetracarboxylic dianhydride, prepared by reaction in a mutual solvent medium such as 1-methyl-2-pyrrolidinone at a temperature greater than 150° C. and less than 200° C., for thin film applications to metallic and non-metallic substrates at conversion temperatures in excess of 250° C., and preferably between 300° to 400° C.

2. Heat-convertible, solvent-soluble, intermediate products of claim 1 in which the upper reaction temperature is 170°-190° C., and the time at the upper temperature is between 5 to 10 hours.

* * * * *